United States Patent [19]
Kimble et al.

[11] Patent Number: 4,951,286
[45] Date of Patent: Aug. 21, 1990

[54] DEVICE AND METHOD FOR SQUEEZED STATE GENERATION BY A COUPLED SYSTEM

[75] Inventors: Harry J. Kimble; Mark G. Raizen, both of Austin, Tex.; Luis A. Orozco, Cambridge, Mass.

[73] Assignee: The University of Texas System, Austin, Tex.

[21] Appl. No.: 102,039

[22] Filed: Sep. 29, 1987

[51] Int. Cl.⁵ .............................................. H01S 3/10
[52] U.S. Cl. ......................................... 372/21; 372/33
[58] Field of Search .................................. 372/21, 33

[56] References Cited

PUBLICATIONS

B. G. Levi, Squeezing the Quantum Noise Limits, *Physics Today*, pp. 17–19 (Mar. 1986).
L. Wu et al., Generation of Squeezed States by Parametric Down Conversion, *Physical Review Letters*, vol. 57, No. 20, pp. 2520–2523 (Nov. 17, 1986).
D. Walls, Growing Expectations from Squeezed States of Light, *Nature*, vol. 324, pp. 210–211 (Nov. 20, 1986).
H. J. Kimble et al., Squeezed State Generation By The Normal Mode Splitting of Two-Level Atoms in an Optical Cavity, Lecture Notes in Physics, vol. 282, Fundamentals of Quantum Optics II, F. Ehlotzky (Ed.), pp. 49–60 (Feb. 22–28, 1987).
B. G. Levi, Still More Squeezing of Optical Noise, *Physics Today*, pp. 20–22 (Mar. 1987).
M. G. Raizen et al., Squeezed State Generation by the Normal Modes of a Coupled System, *Physical Review Letters*, vol. 59, No. 2, pp. 198–201 (Jul. 13, 1987).
M. G. Raizen et al., Squeezing with Coupled Pendulums: Two-Level Atoms in a Cavity, Abstract, *Optics News*, vol. 13, No. 9, p. 106 (Sep. 1987).
L. A. Orozco et al., Squeezed State Generation in Optical Bistability, *Journal of the Optical Society of America B*, vol. 4, No. 6, pp. 1490–1500 (Oct. 1987).

*Primary Examiner*—Leon Scott, Jr.
*Attorney, Agent, or Firm*—Larry W. Evans; Joseph G. Curatolo; Teresan W. Gilbert

[57] ABSTRACT

Squeezed states of light having significant degrees of squeezing are achieved with modest values of atomic density and intracavity electromagnetic (EM) field by a device and method for coupling the EM field within the optical cavity. An oscillatory exchange of excitation then occurs between the atomic polarization and the EM field within the cavity.

16 Claims, 3 Drawing Sheets

DEVICE AND METHOD FOR SQUEEZED STATE GENERATION BY A COUPLED SYSTEM

TECHNICAL FIELD

The present invention relates generally to modifying the quantum fluctuations of an electromagnetic field, thereby reducing noise below the level of fluctuations associated with variations of an electromagnetic field in a vacuum state. More particularly, the present invention relates to generating squeezed states of light by coupling atoms having at least two quantum states to a mode of the electromagnetic field supported by a cavity.

BACKGROUND ART

It is well known that a mode of an electromagnetic ("EM") field may be described as the sum of two quadrature components whose time variations are given by sine and cosine functions, respectively. The amplitude of each quadrature component is a variable having a complementary and uncertainty relationship with the other. The variances in these components and the resulting variations in the EM field in a vacuum state have long been recognized to generate a "shot noise" level providing a limit on the precision of measurements made with an EM field.

Quantum mechanisms has appreciated that the noise level can be reduced below the shot level by making the variances unequal; reduced fluctuations in one quadrature may be achieved by increasing the fluctuations in another quadrature (the so-called "squeezed states"). Such reductions would make possible significant advances in the precision of any EM field dependent measurement or process, such as spectroscopy, interferometry, communications and information storage.

Squeezed states have been generated by several optical processes that nonlineraly modify the amplification of the components in quadrature, including four-wave mixing and parametric oscillation, as described by B. G. Levy in *Physics Today*, pp. 17–19 (March 1986). However, the nonlinear optical interactions considered for squeezed state generation are often too weak to generate significant degrees of squeezing even over a single Reyleigh length. To remedy this situation optical cavities have been employed to enhance the effective nonlinearity with multiple passes through the intracavity medium. Variations in the intracavity medium adiabatically follow variations in the EM field within the cavity where such cavities are operated with the relaxation rate of the intracavity medium being very large compared decay rate of the EM field in the cavity.

We have found that significant degrees of squeezing may be achieved by appropriately coupling the EM field within the cavity to the nonlinear medium with modest values of atomic density and intracavity EM field. An oscillatory exchange of excitation between the atomic polarization and the EM field within the cavity then occurs. Such an exchange is precluded by those optical processes in which either the atomic or EM filed variables are adibatically eliminated.

DISCLOSURE OF INVENTION

It is, therefore, an object of the invention to provide a device and method for modifying the quantum fluctuations of an electromagnetic field by generating squeezed states exhibiting a high degree of squeezing.

It is another object of the invention to provide a device and method, as above, in which there exists a cavity for supporting at least one mode of the EM field and an oscillatory exchange of excitation occurs between the mode of the EM field in the cavity and the collective nonlinear polarization of an intracavity medium.

It is still another object of the invention to provide a device and method, as above, in which rate of decay of the EM field, the rate of relaxation of the intracavity nonlinear medium and the frequency of coupling are selected to yield a normal-mode splitting similar to that encountered when two pendulums are coupled by a spring.

It is yet another object of the invention to provide a device and method, as above, where such coupled system is generated in an optical cavity.

These and other objects and advantages of the present invention over existing prior art forms will become more apparent and fully understood from the following description in conjunction with the accompanying drawings.

In general, a device for modifying the quantum fluctuations of an electromagnetic field includes a nonlinear medium having at least two quantum states and a rate of relaxation between the states; a cavity means for supporting at least one mode of the electromagnetic field, the field within the cavity means coupled with at least a portion of the nonlinear medium forming a composite structure, the cavity means having a rate at which the electromagnetic field decays significantly greater than the rate of relaxation of the nonlinear medium the coupling occurring at a frequency substantially equal or greater than the rate at which the electromagnetic field decays; and, excitation means for executing the composite structure.

A method for modifying the quantum fluctuations of an electromagnetic field includes the steps of generating at least one mode of the electromagnetic field in a cavity coupled with at least a portion of a nonlinear medium having at least two quantum states and a rate of relaxation between said states; the coupling of the cavity and the nonlinear medium forming a composite structre; the cavity having a rate at which the electromagnetic field decays significantly greater than the rate of relaxation of the nonlinear medium; the coupling occurring at a frequency substantially equal or greater than the rate at which the electromagnetic field decays; and, exciting the composite structure.

PREFERRED EMBODIMENT FOR CARRYING OUT THE INVENTION

Figure 1:
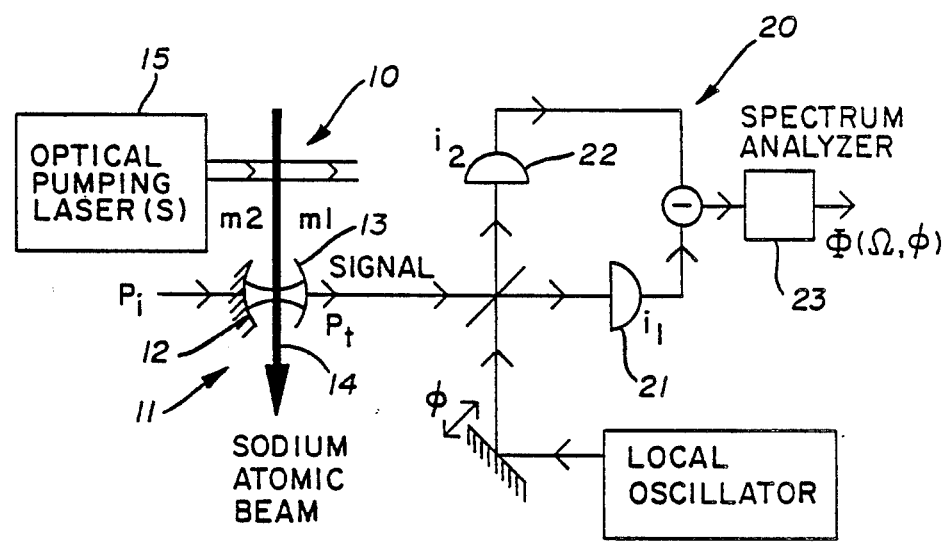
FIG. 1 is a block diagram of an exemplary device, and embodied method, for optical squeezed state generation in accordance with the concept of the present invention.

FIG. 1 depicts an exemplary device, generally indicated by the numeral 10, and embodied method, for the generation of squeezed states by the coupling of a nonlinear medium within an optical cavity. Device 10 produces an oscillatory exchange of excitation between what may be analogized to two oscillators, the nonlinear polarization of the intracavity medium and the mode of the EM field within the cavity. An optical cavity 11 is formed by a pair of mirrors 12, 13 of radius of curvature 1 m separated by 0.83 mm. The transmission coefficients of the two mirrors are $T_1=0.0075$ and $T_2=0.0002$. The measured cavity finesse is $F=660\pm30$, while that inferred from the value of $T_1$ is $F_1=840$. Hence the ratio of output loss through m1 to loss by all other avenues is given by $p=F/F_1=0.79\pm0.06$, which implies a 21% reduction in squeezing as compared to an ideal single-ended cavity.

The intracavity medium includes three overlapping beams of atomic sodium 14 optically prepumped by one (or more) suitable dye laser(s) 15 and prepared in the $(3^2S_{\frac{1}{2}}, F=2, m_F=2)$ state and excited with circularly polarized light to the $(3^2\text{-}P_{3/2}, F=3, m_F=3)$ state of the $D_2$ line. The beams 14 are formed by three 0.5 mm apertures in the source oven lying along a line perpendicular to the plane of FIG. 1 and by a 0.3 mm aperture located 280 mm downstream from the oven and 15 mm upstream from the cavity waist. The maximum absorption $\alpha l$ for this configuration is 0.4. The fluorescence from the optical pumping beam 14 (the frequency of which is offset by an acoustooptic modulator by $-73$ MHz relative to the input beam $P_i$) is used to lock the frequency of the principal exciting dye laser, such that the atomic detuning $\Delta = -14.6$. A second independent dye laser 15 overlaps the optical pumping region and transfer population from the $F=1$ to $F=2$ ground state via the $F=2$ excited state. The pumping fluorescence together with the recorded hysteresis cycle is absorptive optical bistability provide a measure of C, the atomic cooperativity parameter.

Detection of the fluctuations in the quadrature amplitude of the signal beam emitted through the mirror m1 is accomplished with the balanced homodyne detector 20 including two photodiodes 21, 22 such as Model EGG-FFD-060 (available from EGG Electrooptics of Salem, Mass.) with the glass windows removed and with the reflection from the diode surface collected and refocussed onto the photodiode resulting in a quantum efficiency $Q=0.85\pm0.04$. A suitable spectrum analyzer 23 receives the amplified output from the two photodiodes 21, 22. The homodyne efficiency is measured to be approximately $\eta=0.93\pm0.07$ for each channel. Over the range 200–300 MHz the "shot noise" associated with the 2.5 mA dc photocurrent produced by the local oscillator exceeds the amplifier noise level by greater than 5 dB. That the local oscillator is indeed at the vacuum level and does not carry appreciable excess amplitude noise is confirmed by a comparison of the noise levels observed when the two photocurrents $i_1$ and $i_2$ are combined first with 0° and then with 180° phase shift. With the exception of coherent lines at multiples of the 83 MHz longitudinal mode spacing of the ion laser it was determined that the local oscillator fluctuations are within $\pm1\%$ of the vacuum level over the spectral range of interest. Furthermore, with the 180° phase shift actually employed in the squeezing measurements, any excess local oscillator noise is reduced by greater than 12 dB.

Figure 2:
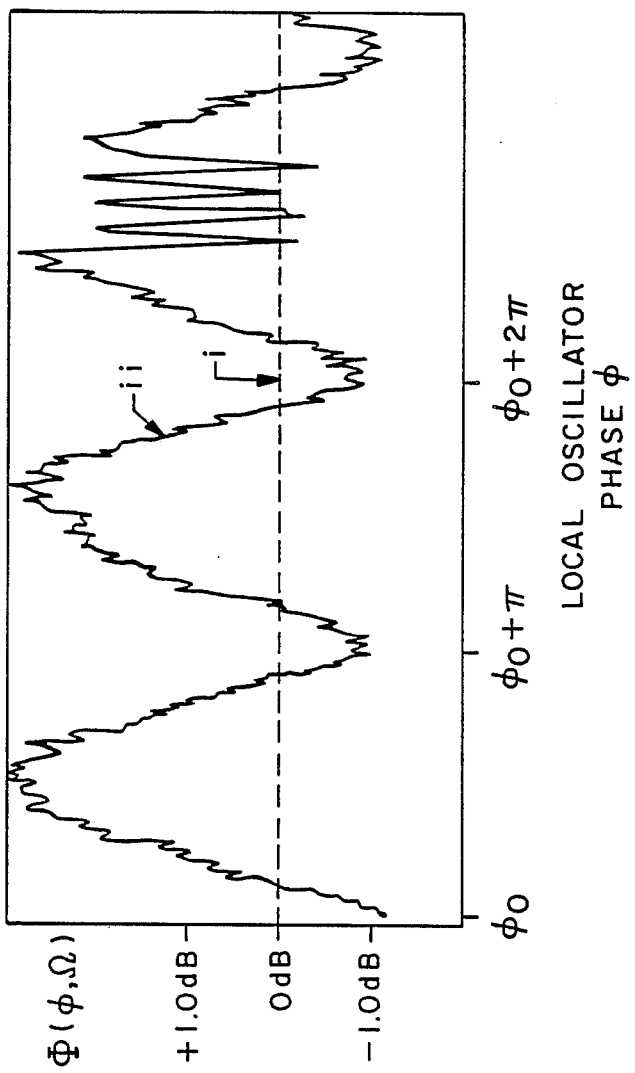
FIG. 2 is a plot of noise reductions below the vacuum level achieved by the squeezed state of light generated with the exemplary device shown in FIG. 1.

An example of noise reduction below the vacuum level observed with device 10 is shown in FIG. 2. The drawing displays the spectral density of photocurrent fluctuations $\Phi(\phi,\Omega)$ (relative to the shot-noise level) at fixed frequency $\Omega/2\Pi=280$ MHz versus local oscillator phase $\phi$. The FIG. 2 trace marked (i) represents the vacuum plus amplifier noise level obtained by either blocking the signal beam, blocking the atomic beams, or detuning the cavity. The trace FIG. 2 labelled (ii) is with the signal beam present and clearly exhibits noise reductions below the vacuum level. It is noted that noise reduction is achieved with incident laser power of only 500 $\mu$W. By constructing histograms of noise levels around the minima in a number of traces as in FIG. 2, the figure of $(-1.0\pm0.1)$dB for the recorded noise reduction is determined, which becomes $(-1.55\pm0.18)$dB after correction is made for the non-zero noise level of the amplifier. This figure represents a level of fluctuations $R_-=0.70\pm0.03$ which is 30% below the level set by the vacuum state of the field at the signal port of the balanced homodyne detector. It was found that the frequency of greatest squeezing occurs close to the coupling frequency $g\sqrt{N}$ where g equals the single atom coupling coefficient for the nonlinear medium in the cavity and N equals the number of atoms of the nonlinear medium in the cavity that the regime of operaton $g\sqrt{N}>N>>$ Gamma, where K is the rate at which the EM field decays and Gamma is the rate of relaxation of the nonlinear medium.

Figure 3:
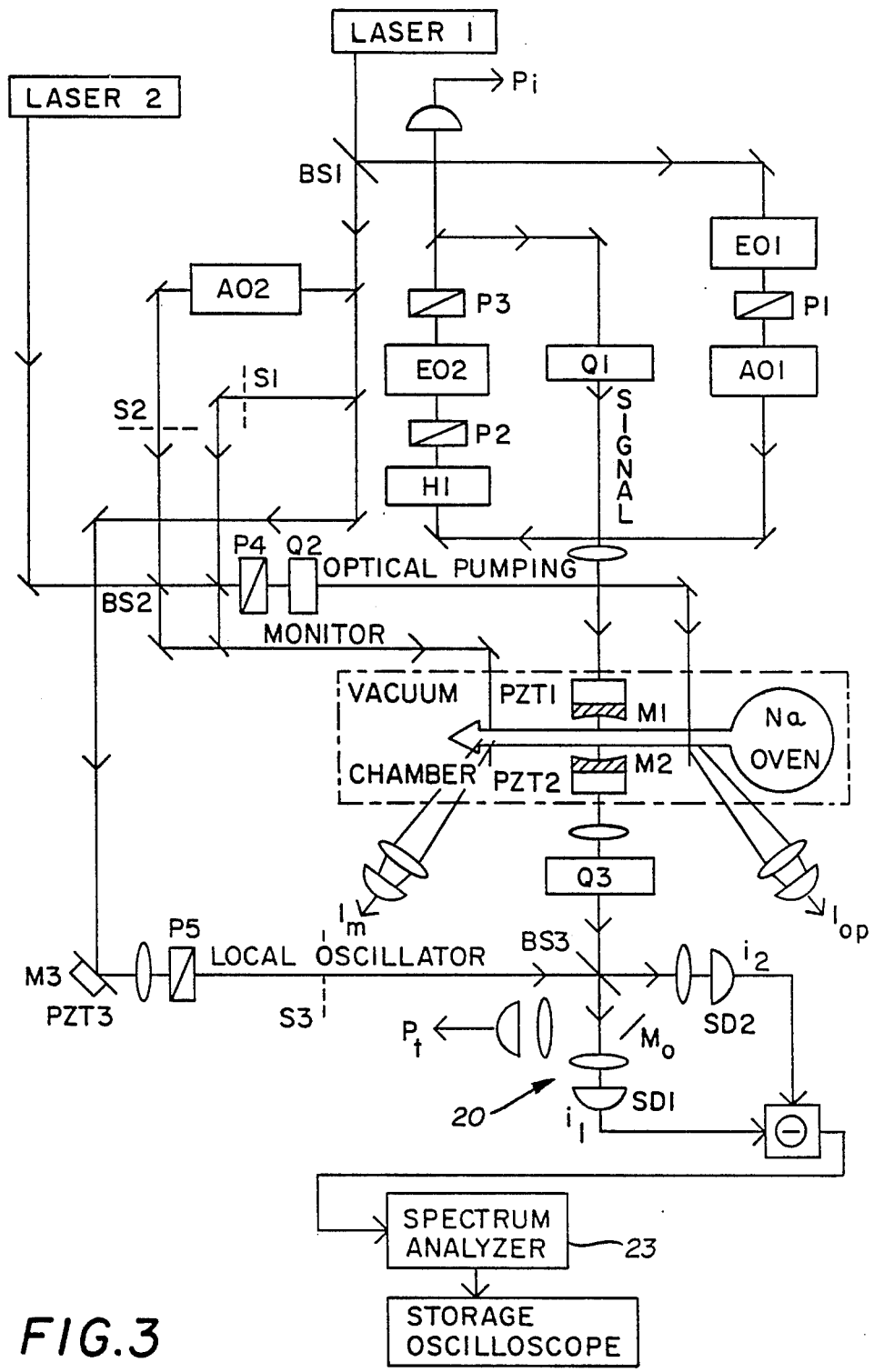
FIG. 3 depicts a device that has been utilized to verify the squeezed state generation of light in accordance with the concept of the present invention and the device shown in FIG. 1.

FIG. 3 depicts in greater detail a device 30 that has been utilized to verify the squeezed state generation in accordance with the concept of the present invention and the device 10. Device 30 includes a frequency stabilized ring dye laser (Model 699-21 commercially available from Coherent, Inc. of Palo Alto, Calif.) (laser 1) that is the principal source of excitation. Part of this laser is split off at the beam splitter (BS1) to serve as the local oscillator (LO), while the other beam from BS1 (the signal beam) drives the cavity for squeezed state generation. The signal beam can be intensity modulated at high frequency by the electrooptic modulator (EO1) or frequency shifted by an acoustooptic modulator (AO1). Low frequency control of the driving intensity is obtained by a half-wave plate (H1) beween crossed polarizers (P1, P2) and with electrooptic modulator EO2 and polarizer P3. A constant fraction of the power from P3 is directed onto a photodiode ($P_i$) calibrated with respect to the actual power incident upon the squeezing cavity formed by mirrors M1 and M2. The polarization of the signal beam is converted to circularly polarized light with the quarter-wave plate (Q1). The signal beam is mode-matched to the squeezing cavity with an efficiency of approximately 90%.

Several laser beams in addition to the signal and local oscillator beams may be employed by device 30. Two beams are split from the LO beam to optically prepump the atomic sodium into the $3^S\text{-}S_{\frac{1}{2}}$, $F=2$, $M_F=2$ state of the $D_2$ line (589 nm). One of these beams is frequency shifted with acoustooptic modulator AO2 to allow a fixed detuning between the optical pumping and the signal beam. The other pumping beam is collinear with the frequency-shifted beam and may be used for initial alignment and for measurements of the input-output characteristics in absorptive bistability. Before interacting with the atoms, the polarizations of all the optical pumping beams are converted to circular polarization with polarizer P4 and quarter-wave plate Q2. Shutters S1 and S2 allow either or both beams to be blocked. A second dye laser (Model 599-21 commercially available from Coherent, Inc. of Palo Alto, Calif.) (laser 2) injected through BS2 transfers the population from the $F=1$ to $F=2$ ground state via the $F=2$ excited state to increase the optical density of the atomic beam entering the squeezing cavity.

The fluorescence from the optical pumping beam ($I_{op}$) may be used to lock the frequency of laser 1. The pumping beam is offset by $-73$ MHz by the acoustooptic modulator AO2 relative to the signal beam $P_i$ keeping S1 closed. The radio frequency driving AO2 is dithered $\pm 2$ MHz at a rate of 110 Hz and a standard phase sensitive detection annd servo arrangement locks the offset frequency of the pumping beam to the transition. Hence the frequency of the signal beam is locked and detuned 73 MHz above the atomic transition frequency ($F=2$, $m_F=2 \rightarrow F=3$, $m_F=3$).

The fluorescence from a monitor beam derived from the unshifted optical pumping beam may be used for alignment purposes. This beam is retroreflected back through the atomic beam with a corner cube prism, and the image of both forward and backward beams is focused onto a photomultiplier tube ($I_m$). The absorption profile observed in fluorescence is the reference in setting the directions of the various laser beams perpendicular to that of the atomic beam.

The local oscillator beam (LO) and the signal beam emerging from the cavity are mode-matched and combined at the beam splitter BS3. The phase of the LO is controlled by a voltage applied to a piezoelectric ceramic (PZT3) on which the mirror M3 is mounted. The light exiting the cavity has its polarization converted from circular to linear with the quarter-wave plate Q3 before mixing with the local oscillator beam at BS3.

Beam splitter BS3 is the input to a balanced homodyne detector (20) formed by the photodiodes SD1 and SD2. The photocurrents are amplified to produce the signals $i_1$ and $i_2$ which are combined in a 180° splitter-conbiner (Model ZSCJ-2-1 commercially available from Mini-Circuits of Brooklyn, N.Y. The relative noise level $\Phi(\phi,\Omega)$ of the output of the splitter is displayed in a spectrum analyzer (Model 8558B commercially available from Hewlett Packard Company of Palo Alto, Calif.) and recorded using a digital storage oscilloscope (Model 9400n commerically available from LeCroy Research Systems Corporation of Spring Valley, N.Y.).

Inasmuch as the present invention is subject to variations, modifications and changes in detail, a number of which have been expressly stated herein, it is intended that all matter described throughout this entire specification or shown in the accompanying drawings to be interpreted as illustrative and not in a limiting sense. It should thus be evident that a device constructed according to the concept of the present invention, and reasonably equivalent thereto, will accomplish the objects of the present invention and otherwise substantially improve the art of controlling the quantum fluctuations of an electromagnetic field by generating squeezed states.

We claim:

1. A device for modifying the quantum fluctuations of an electromagnetic field, comprising:
    a nonlinear medium having at least two quantum states and a rate of relaxation between said states;
    a region within which both an electromagnetic field and said nonlinear medium are present and interact, said electromagnetic field in said region having a rate of relaxation greater than said rate of relaxation of said nonlinear medium; and,
    excitation means for exciting said nonlinear medium in said region and exciting said electromagnetic field in said region having said greater rate of relaxation to thereby induce an oscillatory exchange of excitation between said nonlinear medium and said electromagnetic field, said oscillatory exchange of excitation occurring at a coupling frequency substantially equal to or greater than said rate at which said electromagnetic field decays.

2. A device for modifying the quantum fluctuations of an electromagnetic field, as set forth in claim 1, wherein said electromagnetic field is light, said region is an optical cavity, and a squeezed state of light is produced as a result of said nonlinear medium and said electromagnetic field exchanging excitation in an oscillatory manner.

3. A device for modifying the quantum fluctuations of an electromagnetic field, as set forth in claim 2, wherein said nonlinear medium is sodium.

4. A device for modifying the quantum fluctuations of an electromagnetic field, as set forth in claim 2, further including detector means for detecting the amplitude of quantum fluctuations, said detector means receiving said squeezed state of light.

5. A device for modifying the quantum fluctuations of an electromagnetic field, as set forth in claim 4, wherein said detector means includes a balanced homodyne detector.

6. A device for modifying the quantum fluctuations of an electromagnetic field, as set forth in claim 4, wherein said detector means includes means for receiving the output from said detector means and analyzing the received spectrum.

7. A device for modifying the quantum fluctuations of an electromagnetic field, as set forth in claim 1, wherein the device has a normal mode frequency at which the modification of the quantum fluctuations is greatest.

8. A device for modifying the quantum fluctuations of an electromagnetic field, as set forth in claim 7, wherein said normal mode frequency is substantially equal to the product of the single-atom coupling coefficient for said nonlinear medium and the square root of the number of atoms of said nonlinear medium in said region.

9. A device for modifying the quantum fluctuations of an electromagnetic field, as set forth in claim 1, wherein said excitation means includes a source of light radiation for generating said electromagnetic field.

10. A method for modifying the quantum fluctuations of an electromagnetic field, comprising the steps of:
    generating an electromagnetic field;
    providing in a region with said electromagnetic field a nonlinear medium having at least two quantum states and a rate of relaxation between said states, said electromagnetic field in said region having a rate of decay greater than said rate of relaxation of said nonlinear medium; and,
    exciting said electromagnetic field and said nonlinear medium within said region, inducing an oscillatory exchange of excitation between said electromagnetic field and said nonlinear medium, said oscillatory exchange of excitation occurring at a frequency substantially equal to or greater than said rate at which said electromagnetic field decays.

11. A method for modifying the quantum fluctuations of an electromagnetic field, as set forth in claim 10, wherein said step of generating includes the step of generating light, said region is an optical cavity, and further including the step of producing a squeezed state of light.

12. A method for modifying the quantum fluctuations of an electromagnetic field, as set forth in claim 10, further including the step of receiving said squeezed state of light and detecting amplitude quantum fluctuations.

13. A method for modifying the quantum fluctuations of an electromagnetic field, as set forth in claim 12, wherein said step of receiving said squeezed state of light and detecting the amplitude of quantum fluctuations includes the step of detecting said amplitude of quantum fluctuations using a balanced homodyne detector.

14. A method for modifying the quantum fluctuations of an electromagnetic field, as set forth in claim 12, further including the step of receiving the detected amplitude of quantum fluctuations and analyzing the receiving spectrum.

15. A method for modifying the quantum fluctuations of an electromagnetic field, as set forth in claim 10, wherein said step of exciting further includes the step of generating the greatest modification of the quantum fluctuations at the normal mode frequency.

16. A method for modifying the quantum fluctuations of an electromagnetic field, as set forth in clam 15, wherein said step of generating the greatest modification of the quantum fluctuations at a normal mode frequency occurs at a frequency substantially equal to the product of the single-atom coupling coefficient for said nonlinear medium and the square root of the number of atoms of said nonlinear medium in said region.

* * * * *